United States Patent
Gavel et al.

(10) Patent No.: US 8,173,234 B2
(45) Date of Patent: *May 8, 2012

(54) LABELS

(75) Inventors: Thierry Gavel, Brussels (BE); Wayne Middleton, Wigton (GB); Veli Nasib, Espoo (FI); Gianpaolo Faletti, Brussels (BE)

(73) Assignee: Innovia Films Limited, Wigton, Cumbria (GB)

( * ) Notice: Subject to any disclaimer, the term of this patent is extended or adjusted under 35 U.S.C. 154(b) by 0 days.

This patent is subject to a terminal disclaimer.

(21) Appl. No.: 12/222,498

(22) Filed: Aug. 11, 2008

(65) Prior Publication Data

US 2008/0305326 A1    Dec. 11, 2008

Related U.S. Application Data

(62) Division of application No. 10/471,694, filed as application No. PCT/EP02/02726 on Mar. 13, 2002, now Pat. No. 7,687,125.

(30) Foreign Application Priority Data

Mar. 15, 2001   (GB) .................................. 0106410.4

(51) Int. Cl.
    *B32B 9/00*   (2006.01)
(52) U.S. Cl. ...... 428/40.1; 428/42.1; 428/342; 428/343; 428/351; 428/352
(58) Field of Classification Search .................. None
    See application file for complete search history.

(56) References Cited

U.S. PATENT DOCUMENTS

| | | | |
|---|---|---|---|
| 2,153,144 A | | 4/1936 | Gilfillan |
| 3,325,306 A | | 6/1967 | Caldwell et al. |
| 3,635,746 A | * | 1/1972 | Karlan ............................. 428/48 |
| 3,978,274 A | * | 8/1976 | Blum ......................... 428/476.3 |
| 4,275,106 A | * | 6/1981 | Watanabe .................... 428/200 |
| 4,444,839 A | | 4/1984 | Dudzik et al. |
| 4,763,930 A | * | 8/1988 | Matney ........................... 283/81 |
| 5,194,501 A | * | 3/1993 | Babu et al. ..................... 525/103 |
| 5,662,985 A | * | 9/1997 | Jensen et al. ................ 428/195.1 |
| 5,663,288 A | * | 9/1997 | Shinoda et al. ................ 528/354 |
| 5,885,678 A | * | 3/1999 | Malhotra ................... 428/32.29 |
| 5,895,723 A | * | 4/1999 | Utz ................................. 428/480 |
| 5,971,437 A | * | 10/1999 | Sakashita ........................ 283/81 |
| 6,051,311 A | * | 4/2000 | Osaka .......................... 428/352 |
| 6,187,389 B1 | * | 2/2001 | Overcash et al. ............. 427/488 |
| 6,379,766 B1 | * | 4/2002 | Blom et al. .................. 428/42.1 |
| 6,803,085 B2 | | 10/2004 | Blom et al. |

FOREIGN PATENT DOCUMENTS

| | | |
|---|---|---|
| BE | 859414 A | 2/1978 |
| EP | 1381654 | 2/1978 |
| EP | 0 340 910 | 11/1989 |
| EP | 0 587 069 | 3/1994 |
| EP | 0 637 618 | 2/1995 |
| EP | 1 381 654 | 10/2005 |
| JP | 42-51887 | 9/1992 |
| WO | 99/19412 | 4/1999 |

OTHER PUBLICATIONS

Database WPI, Section Ch, Week 199242, Derwent Publications Ltd., XP002205375 & JP 04 251887 (1992).

* cited by examiner

*Primary Examiner* — Callie Shosho
*Assistant Examiner* — Cheng Huang
(74) *Attorney, Agent, or Firm* — Ping Wang; Andrews Kurth, LLP

(57) ABSTRACT

There is described a label comprising a self supporting sheet of a biopolymer, preferably cellulose (e.g. regenerated cellulose, cellulose acetate and/or PLA), said sheet being substantially transparent to visible light when uncoated, wherein said sheet comprises: (a) a first coating on at least one surface thereof to aid printability thereon; (b) a second coating comprising an adhesive dispersible in an aqueous medium; and (c) optionally a third coating to modify water permeability through the sheet. The labels are to be applied to articles such as glass containers. Preferred labels are wet glue cellulose labels, for example where the first coating also comprises a copolymer of vinyl chloride and vinyl acetate to aid water permeability and hence rapid drying of the label on an article.

14 Claims, No Drawings

LABELS

This is a divisional of Ser. No. 10/471,694, filed May 24, 2004 now U.S. Pat. No. 7,687,125, which is a 371 of PCT/EP02/02726, filed Mar. 13, 2002, which claims priority of UK Application No. 0106410.4, filed Mar. 15, 2001. The entirety of all of the aforementioned application is incorporated herein by reference.

FIELD

The present invention relates to the field of labels especially labels made from biopolymers used with aqueous adhesives.

BACKGROUND

Labels have been conventionally fixed onto an article with pressure sensitive adhesives in the ease of thermoplastic films (such as polyolefins, e.g. biaxially oriented polypropylene-BOPP) and an adhesive dispersed in an aqueous medium in the case of paper. The latter are often referred to as wet glue labels but can also be called cold glue or just glue labels.

The market for alcoholic beverages such as beer, wine or spirits is more and more competitive and breweries need to find ways of capturing their audience and enticing them to purchase their product. Packaging is a major part of the promotional mix especially at point of sale in supermarkets and the drive for differentiation amongst the manufacturers is furious.

The 'no-label' look came into fashion in the pressure sensitive (PS) market several years ago and retailers have found many advantages from this new form of shelf appeal. This is achieved by applying a clear transparent label to the article (or a coloured transparent label matched to the colour of the article). As an alternative or as well a transparent or clear label can be coated (e.g. printed or metallised) completely or partially on its reverse side (i.e. the "interior" side to be adhered to the article) so that such a coat or printing is better protected from wear and tear (rubbing, attack by solvents etc) as it is not on the exterior of the article.

However due to the process used to apply a wet glue label, the conventional transparent plastic films (OPP, polyester-PE, polyethylene phthalate-PET) currently used in the PS market have various disadvantages when used as the substrate to produce a transparent wet glue label. The properties of these thermoplastic films are different from the paper labels used on conventional wet glue machines. For example thermoplastic films have a high barrier to moisture (they are not semi-permeable to water) and this causes a wet glue to take much longer to dry (and hence the label to fix in place) which can be disadvantageous on a high speed labelling line or where precise location of the label is required. Thus thermoplastic films are not an ideal replacement for a paper label on a conventional production line set up to apply a wet glue label to an article such as a bottle. Aqueous coatings are also not easily compatible with and do not adhere well to such thermoplastic films which are often hydrophobic without further surface treatments.

The substrate conventionally used to prepare wet glue labels is paper which is not transparent. Thermoplastic films are transparent but because of the previous stated disadvantages with thermoplastic films and wet glue coatings, it has been necessary to use pressure sensitive adhesives to provide an article with a no look label having acceptable performance. Thus manufactures currently using labelling equipment for paper wet glue labels are faced with a significant capital outlay and disruption to change the to equipment compatible with pressure sensitive labels if they wish to move to no-look labelling.

Certain water based adhesive systems have been developed for use with labels.

WO 97/00298 (Henkel) discloses an adhesive system for gluing all-around plastic labels onto plastic bodies. The adhesive system has a pick-up glue and an overlapping glue. It is characterised in that the pick-up glue has a sufficient wet gluing power in the wet state and does not adhere to at least one of the substrates in the dried state. The pick-up glue contains 5 to 85% by weight of at least one water-soluble polymer based on casein, starch, dextrin, glucose, polyvinyl alcohol, polyurethane or polyacrylic acid, 0 to 1.0% by weight of at least one anti-foaming agent, and 0 to 1.0% by weight of at least one preservative, the remaining percentage being water.

U.S. Pat. Nos. 4,464,202 and 4,462,838 (both Henkel) describes an aqueous adhesive compositions useful for labelling bottles More particularly, these inventions relate to aqueous adhesive compositions for mechanical labeling based upon starch derivatives and having a content of flow-regulating additives and, optionally, other customary additives such as: (a) at least one hydroxyalkyl ether of oxidized starch with a mean degree of substitution (MS) of 0.2, together with (b) at least one polymer dissolved in the aqueous phase, the polymer being selected from the group consisting of water-soluble cellulose derivatives, water-soluble synthetic polymers, casein, and water-soluble starch derivatives different from component (a).

U.S. Pat. No. 4,675,351 (Borden Inc.) describes an adhesive formulation useful for applying a paper label to a glass bottle, having the tack and rheology making it suitable for use in modern labeling equipment, and imparting water immersion resistance in ice water for a period of at least 72 hours, which it is based on soy protein isolate and does not use casein.

U.S. Pat. No. 5,455,066 (Henkel) describes a water-containing adhesive useful for labelling bottles. The adhesive is based on casein, water-soluble extenders, natural or synthetic resin acids, resin alcohols or resin esters, and an alcohol.

Other non-aqueous adhesives systems have been developed for use with polymer labels.

U.S. Pat. No. 5,366,251 (Brandt) describes a clear acrylic coated label which is used to provide a reverse side printed water-proof label. A heat activated solvent based adhesive system is used to bind the film to the article such as a glass container.

DETAILED DESCRIPTION

The applicant has found that when wet glue was applied directly to conventional OPP label film, the adhesive took days if not weeks to dry. Such poor performance makes wet glues unsuitable for use directly on hydrophobic untreated OPP film. It has been attempted to modify such hydrophobic plastic polymeric films to make them suitable for use as labels fixed with a wet glue adhesive. However such techniques are very different from those required to use wet glue with biopolymeric films.

WO 97/43744 (Nordenia) describes an adhesive label consisting of a water-soluble layered plastic film fully or partially coated on its adhesive side with a dry layer of adhesive made of polyvinyl alcohol, polyvinyl acetate or adhesive based on starch, cellulose, glucose, or dextrin.

The adhesive is activated by moistening the label with water. After drying, the adhesive layer can be removed residue-free from the outer side of the container.

WO 99/19412 (Process Resources Corp.) (=U.S. Pat. No. 6,306,242 (Dronzek)) describes a method of fixing polypropylene labels to glass or metal articles with a water based adhesive. The hydrophobic PP must be coated with a hydrophilic coating to make the film compatible with the wet glue. Such a method is incompatible with conventional equipment used with paper labels.

WO 01/56893 (Grafiche Record SRL) describes a method of fixing a polypropylene (PP) label to an article with a water based adhesive (wet glue). Although the method is designed for use with conventional paper label equipment, the PP film must coated with acrylic polymers, printed with inks comprising oxidising salts and then overpainted with a coat having a specific terpolymer therein to receive the wet glue. This is an expensive and complicated process.

Thus, it is desirable to provide an improved label and process for making said label which solves some or all of the problems described herein and for example can be used with the well known labelling equipment used to apply paper wet glue labels, can dry in situ in a reasonable time without the need to use exotic coatings, yet retains the advantages associated with a label of a polymeric film, such as transparency to achieve a no-label look or a protected coat (e.g. metallisation or printing) on the interior face of the label.

Therefore, broadly in accordance with the present invention, there is provided a label comprising a self supporting sheet of a biopolymer, said sheet being substantially transparent to visible light when uncoated characterised in that the sheet comprises:

(a) a first coating on at least one surface thereof to aid printability thereon;

(b) a second coating comprising an adhesive dispersible in an aqueous medium; and (c) optionally a third coating to modify water permeability through the sheet.

As defined herein biopolymer excludes paper which of course is not transparent and is arguably is also non-polymeric.

The terms first, second and third coating and first, second and third composition as used herein are synonymous.

Preferably the first (printable) coating is applied to only one side of the film-the reverse side which is to be adhered to the article-and then is printed thereon before the adhesive is applied.

Preferably the second (adhesive) coating is applied to only one side of the film on top of the other coatings. Optionally the second coating is dried thereon so that the aqueous adhesive becomes active once the second coating is re-moistened.

Preferably the third coating of the film modifies the water permeability thereof into an optimal tailored range. The film water vapour transmission rate (WVTR) of the label must not so high (e.g. uncoated cellulose film) that water evaporates through the film too fast so the wet glue on the reverse side dries too quickly so that the glue because too tacky before there is time to allow the label to be correctly positioned onto the article by a conventional paper label machine.

Yet the WVTR of the label must not be too low (such as uncoated OPP film) that the adhesive dries too slowly so the label is not properly fixed onto the article and can slide around on its surface on a cushion of liquid adhesive. To achieve the optimal WVTR a third coating may be applied to both sides of the film.

The first (printable) coating and second (aqueous adhesive) coating may be applied to opposite surfaces of the film label (i.e. to define an adhesive side and a printed side).

Preferably the first (printable) coating and the third (water permeability modifying) coating may be the same or may be combined so the printable coating may also modify the water permeability of the film as desired. More preferably the first and third coatings (optionally the combined as the same composition) may be applied to at least one side of the film, most preferably to both sides of the film to form a two side coated film printable on both sides and with optimal water permeability.

The second and third coatings may also be applied to the same side of the film, both sides of the film or different sides. Similarly the second and third composition may be the same or may be combined so the aqueous adhesive may also modify water permeability of the film as desired.

Thus the first, second and third coatings may comprise the same and/or different compositions and may be applied to either or both surfaces of the film simultaneously and/or sequentially. A further purpose of the first and/or third coatings added to the reverse side of the film is to aid adhesive anchorage of the second adhesive coat.

It is also possible that the films of the present invention my be coated or printed with a further non-transparent coat or layer (e.g. a metallised coat) on the side of the film which in use is to be stuck onto the article with the wet glue. In this manner the coating or printing is seen through the transparent film but is protected from external wear. It is even possible that the initially clear or transparent biopolymer film is weakly opaque such that some of a reverse side design can be seen through the label and/or through the other side of the article (e.g. in a bottle through its contents on the interior side of the label).

Conveniently the thickness of the second coating (calculated from the units of g per m$^2$) is at least about 10 g per m$^2$, preferably 20 g per m$^2$, more preferably from about 30 g per m$^2$ to about 40 g per m$^2$, most preferably about 33 g per m$^2$ to about 35 g per m$^2$. These values are calculated from the wet value of the liquid coating when applied. After drying the dry-coat weight is typically 50% that of the wet coat weight.

The biopolymer may be a single sheet or form part of a laminate, preferably the label is either 1 or 2 ply. The advantage of a two ply or duplex structure is that it has improved wet strength for wet glue label applications. Without being bound by any theory it is believed that the structure of a single layer biopolymeric film such as a regenerated cellulosic film can be divided into surface regions (at each of the two sides of the film) which are less absorbent to liquid (analogous to a loufa) and an inner or core region more absorbent to liquid (analogous to a sponge). A duplex film is formed by adhering two webs of a single layer film together e.g. by laminating them together in a drier. A duplex biopolymer film has four skin and two core layers compared to a single ply film with has two skin layers and one core, and this is believed to be the mechanism for improved wet strength of duplex films which are especially preferred for use to make the labels of the present invention.

The biopolymers which may be used to form (or which substantially comprise of the present invention may be obtained and/or obtainable from a biological (preferably plant and/or microbial) source and may comprise those organic polymers which comprise substantially carbon, oxygen and hydrogen. Conveniently biopolymers may be selected from carbohydrates; polysaccharides (such as starch, cellulose, glycogen, hemi-cellulose, chitin, fructan inulin; lignin and/or pectic substances); gums; proteins, optionally cereal, vegetable and/or animal proteins (such as gluten [e.g. from wheat], whey protein, and/or gelatin); colloids (such as hydro-colloids, for example natural hydrocolloids, e.g. gums); other polyorganic acids (such as polylactic acid and/or polygalactic acid) effective mixtures thereof; and/or effective modified derivatives thereof.

Further details of each of the biopolymers which may be used to form films of the invention are given below.

Starch may comprises native and/or modified starch obtained and/or obtainable from one or more plant(s); may be a starch, starch-ether, starch-ester and/or oxidised starch obtained and/or obtainable from one or more root(s), tuber(s) and/or cereal(s) such as those obtained and/or obtainable from potato, waxy maize, tapioca and/or rice.

Gluten may comprise a mixture of two proteins, gliadin and glutenin whose amino acid composition may vary although glutamic acid and proline usually predominate.

Gums are natural hydro-colloids which may be obtained from plants and are typically insoluble in organic solvents but form gelatinous or sticky solutions with water. Gum resins are mixtures of gums and natural resins.

As used herein the term carbohydrate will be understood to comprise those compounds of formula $Cx(H_2O)_y$ which may be optionally substituted. Carbohydrates may be divided into saccharides (also referred to herein as sugars) which typically may be of low molecular weight and/or sweet taste and/or polysaccharides which typically may be of high molecular weight and/or high complexity.

Polysaccharides comprise any carbohydrates comprising one or more monosaccharide (simple sugar) units. Homopolysaccharides comprise only one type of monosaccharide and heteropolysaccharides comprise two or more different types of sugar. Long chain polysaccharides may have molecular weights of up to several million daltons and are often highly branched, examples of these polysaccharides comprise starch, glycogen and cellulose.

Polysaccharides also include the more simple disaccharide sugars, trisaccharide sugars and/or dextrins (e.g. maltodextrin and/or cyclodextrin).

Polysaccharides may comprise a polymer of at least twenty or more monosaccharide units and more preferably have a molecular weight ($M_w$) of above about 5000 daltons. Less complex polysaccharides comprise disaccharide sugars, trisaccharide sugars, maltodextrins and/or cyclodextrins. Complex polysaccharides which may be used as biopolymers to form or comprise films of present invention comprise one or more of the following: Starch (which occurs widely in plants) may comprise various proportions of two polymers derived from glucose: amylose (comprising linear chains comprising from about 100 to about 1000 linked glucose molecules) and amylopectin (comprising highly branched chains of glucose molecules).

Glycogen (also known as animal starch) comprises a highly branched polymer of glucose which can occur in animal tissues.

Cellulose comprises a long unbranched chain of glucose units.

Chitin comprises chains of N-acetyl-D-glucosamine (a derivative of glucose) and is structurally very similar to cellulose.

Fructans comprise polysaccharides derived from fructose which may be stored in certain plants.

Inulin comprises a polysaccharide made from fructose which may be stored in the roots or tubers of many plants.

Lignin comprises a complex organic polymer that may be deposited within the cellulose of plant cell walls to provide rigidity.

Pectic substances such as pectin comprise polysaccharides made up primarily of sugar acids which may be important constituents of plant cell walls. Normally they exist in an insoluble form, but may change into a soluble form (e.g. during ripening of a plant).

Polylactic and/or polygalactic polymers and the like comprise those polymeric chains and/or cross-linked polymeric networks which are obtained from, obtainable from and/or comprise: polylactic acid; polygalactic acid and/or similar polymers and which may be made synthetically and/or sourced naturally.

Other types of polysaccharide derivatives one or more of which may also be used to form (in whole or in part) films of the present invention may comprise any effective derivative of any suitable polysaccharide (such as those described herein) for example those derivatives selected from amino derivatives, ester derivatives (such as phosphate esters) ether derivatives; and/or oxidised derivatives (e.g. acids).

Preferred biopolymer films are those formed from a biopolymer selected from cellulose, cellulose derivatives (such as cellulose acetate) and/or polylactic acid.

More preferred films comprise cellulose which is substantially continuous, more preferably non-woven and/or entangled, in structure. Most preferably the film of the invention comprises non-microbial cellulose such as cellulose regenerated from a cellulosic dispersion in a non-solvating fluid (such as but not limited to NMMO and/or a mixture of LiCI and DMP). One specific example is "viscose" which is sodium cellulose xanthate in caustic soda. Cellulose from a dispersion can be cast into film by regenerating the cellulose in situ by a suitable treatment (e.g. addition of suitable reagent which for viscose can be dilute sulphuric acid) and optionally extruding the cellulose thus formed. Such cellulose is known herein as regenerated cellulose and preferred films of the present invention comprise regenerated cellulose.

Conveniently films of the present invention substantially comprise cellulose from a wood source, most preferably at least 90% of the cellulosic material is from a wood source.

Preferably the first coating is applied to aid printability and also to help to control evaporation rate of the water from the glue (first coat also acts as the third coating) once the label has been applied to an article. More preferably (and like the biopolymer substrate) the first/third coating is semi-permeable. This enables the second coating of the aqueous adhesive composition to dry sufficiently quickly to set the label in position on to the bottle. If the moisture barrier of the combined first/third coating is too good the drying time is extended, which increases the chance of the label moving and finally drying in the wrong place.

The first coating comprises component(s) which are receptive to printing inks and/or as the anchor of an ink to the label surface. The second coating (wet label adhesive) may comprise any suitable adhesive which is dispersible in an aqueous medium, for example casein adhesive, which contains 50% water.

The third coating comprises a component to control water permeability, preferably comprising a ethylenic (co)polymer substituted by electronegative groups, more preferably a (co)polymer of vinyl chloride, acrylic, vinyl acetate, polyester and: or isocyanate monomers, most preferably the coating is substantially free of chlorine containing species. Most preferred components of a combined first (printable) and third (WVP) coating are chlorine-free acrylic, polyesters and polyurethanes.

Labels of the invention may be coated on one side or two sides of the film, although two side coated labels are preferred. Two side coated films are more stable and are less prone to problems such as wrinkling or creasing, so producing labels of greater aesthetic appeal.

Any of the first, second and/or third coating may also comprise waxes and other conventional additives as required to modify the slip and block resistance of the coating.

Such additives may be selected from one or more of the following and/or mixtures thereof fatty acids e.g. Behenic Acid; fatty acid ester amide (amide wax) e.g. that available commercially under the trade name Lanco wax E2S; hydrogenated castor oil mono and diesters of phosphoric acid e.g. that are available commercially under the trade name Crodafos S2; maleic acids; similar acids and/or ester, and/or salts thereof and/or other simple derivatives thereof; and/or inorganic materials such as clays e.g. china clay.

Preferably the biopolymer wet glue labels of the present invention further exhibit at least one of the following advantageous properties.

Due to the inherent properties of biopolymer (preferably cellulose) film, the film may swell when exposed to water and will definitely shrink to less than its original measurements when dried after wetting. Thus when adhesive is being applied to an article (such as a container e.g. a bottle) the label may swell, but after it has been applied to the article the label will shrink whilst drying and form a tighter bond around the article.

Because of the permeability of biopolymers especially cellulose, the adhesive can dry within a reasonable time similar to paper and so these labels can be used as drop in replacements for paper wet glue labels.

A coated labels have good anchorage of inks and readily allow uptake of water by the biopolymer. When dry preferred labels of the invention dry smoothly onto the surface of the article.

Because of the permeable nature of the biopolymer the labels of the invention have the ability to be washed off and the article (e.g. bottle) can be more easily re-used. This is particular important in some countries such as Germany and Finland.

Labels formed from cellulose in particular have good slip and antistatic properties which are required for ease of sheet feeding and cut and stack processing of labels. This is inherent in cellulose film.

Water permeability herein may be measured in standard test BS 3177 at 37° C. and 75% relative humidity (RH). Conveniently the water vapour permeability is from about 10 to about 1000 g per $m^2$ per 24 hours; more conveniently from about 50 to about 600 g per $m^2$ per 24 hours. Preferably the water permeability of the film is from about 100 to about 400 $g/m^2$ per day, more preferably from about 150 to about 300 $g/m^2$ per day, most preferably from about 200 to about 250 $g/m^2$ per day; for example about 210 $g/m^2$ per day. Alternatively or as well the as water permeability, the water vapour transmission rate (WVTR) of the films herein may be measured in standard test ASTM. E 96 at 37° C. and 30% relative humidity (RH) using the water method for the dry film and the inverted water method for the wet film. Preferably the WVTR of the dry film is as given above for water permeability.

When measured the wet film may show from about 5 to about 15 fold, preferably from about 5 to about 8 fold higher WVTR than the same film when dry.

Preferably the film further comprises a plasticiser, more preferably in an amount from about 10% to about 30%, most preferably about 20% by weight of the cellulose film. The plasticiser may be any suitable material which is compatible with food packaging (for example is food contact approved) and/or substantially non-toxic in the amounts used. For example the plastcisier may be selected from glycols, (such as MPG, TEG, PEG), urea, sorbitol, glycerol and/or mixtures thereof in any suitable mixtures and ratios to those skilled in the art. For example one suitable plasticiser may comprise such as a mixture of sorbitol and glyercol in the respective weight ratio of 60:40 by weight of solids.

Since the cellulose film is strong and inert, if necessary it can be sterilised in any convenient way. It may be stored at any temperature, and does not require special conditions. It is of unlimited durability. The film has determined permeability to liquids and air, a characteristic molecular weight and structure, a predictable thickness when dehydrated, in addition to other specific physical characteristics.

The cellulosic film may comprise other conventional film additives and/or coatings well known in the art of film making such as those which are compatible with packaging, preferably food packaging and more preferably are food contact approval by the FDA in the US (and/or analogous agencies in other countries). Such additives and/or coatings may comprise softeners, anti-static agents, particulate additives and/or may be tinted or otherwise treated, for example impregnated with one or more other active ingredients, provided such modifications are compatible with the uses of the film as a label as described herein.

The average thickness of a film of the present invention may be up to about 2 mm (e.g. if a foamed film is used), preferably up to about 50 microns before incorporation of the particulate additives. More preferably the average thickness of a film of the present invention is from about 20 to about 45 microns, most preferably from about 20 to about 30 microns. Preferred films used in the present invention are duplex laminated films (i.e. where a single web is laminated onto itself) to provide the improved stiffness desirable in a label.

In a further aspect of the present invention, broadly there comprises a method for preparing and/or applying a label, the method comprising the steps of (a) coating a biopolymeric sheet on at least one surface thereof with an aqueous composition with an adhesive dispersed therein;

(b) treating at least the opposite surface of the sheet, optionally both surfaces, to improve its printability, (c) drying the film to remove excess water;

(d) applying the label to an article; and (e) optionally drying the article to affix the label thereon.

Any suitable methods of making a biopolymer may be used preferably a cellulose film, more preferably made by a regenerated method. A most preferred method is the well known viscose method for preparing cellulose film in which case the particles are added to the viscose.

Many other variations and the details of construction and composition will be apparent to those skilled in the art and such variations are contemplated within the broad scope of the present invention.

One aspect of the invention is the use of a film of the present invention to form a label as described herein.

Another aspect of the invention is the use of a cellulosic film of the present invention to fix a label to an article.

Further aspects of the invention and preferred features thereof are given in the claims herein.

It will be appreciated that although the films of the present invention are primarily designed for use in the field of labels for customer articles, especially food and beverages, more especially alcoholic beverages such as spirits, but they could be used in other applications where similar film properties are desired.

Forming Viscose

Wood pulp (usually as sheets) was added to a caustic soda (NaOH) solution containing a manganese (e.g. $MnSO_4$) catalyst mixed therein. The mixture was agitated to form a slurry which was fed through a press where it was compressed to produce a continuous mat of alkali-cellulose which was conveyed to a shredding machine and broken into crumbs. The crumbs were slowly fed by a large conveyer belt through a controlled humidified atmosphere to be chemically aged. Without wishing to be bound by any mechanism it is believed that the structure of large cross-linked lignin wood fibres in the pulp was oxidised by the NaOH (with the help of the $MnSO_4$ catalyst) to be chemically broken down into smaller sized (micron-sized) particles. The aged alkali cellulose mixture was cooled to ambient temperature and added to a pressure vessel. Carbon disulphide was then added to the alkali-cellulose under reduced pressure and the mixture turned from white to orange yellow as sodium cellulose xanthate was formed. A measured amount of weak caustic soda solution was added to the mixture, which was agitated until it became a thick orange liquid (also known as unripe viscose). The unripe viscose was homogenised, filtered, deaerated and filtered once more to form a clean clear liquid (also known as pure viscose) which was cast into a highly transparent, flexible cellulose film as described below. It will also be appreciated that if coloured or opaque cellulose film was desired suitable colorants and/or opacifiers may also be added to the pure viscose before casting the film as well as any other compatible and suitable ingredients which it is desired to incorporate throughout the film.

Casting Film

Viscose (formed as described above) was extruded under pressure through a jet into a bath of dilute sulphuric acid to regenerate a continuous web of cellulose film. The film web which was initially opaque and flimsy was passed in succession through various baths (e.g. of acid, water, soda sulphide, water, bleach, water and softener) and over many rollers (typically over 250) to remove impurities, recover carbon disulphide and/or wash the web so the final film produced had the desired strength and flexibility. When the web of wet cellulose film passed from the final bath it was dried in hot air to remove excess water and then conditioned in moist air (to control the correct amount of water content in the final film to ensure its optimal properties). The film web may be optionally treated (e.g. by a corona discharge) to provide an anchor to chemically bond with further optional coatings and then the web was wound onto a roller to produce a finished cast roll of regenerated cellulose film. Depending on the desired end-use the cellulose film may be used without further treatment and/or coatings.

These cellulose films used in the labels of the invention have many other well known useful properties such as one or more of the following: excellent barrier to gas (e.g. to oxygen), water permeability (the degree of which can be tailored by the process by which it is made); semi-permeability (for example as a membrane for dialytic and/or osmotic processes); non-fusable core (i.e. film does not melt); natural dead fold, ease of opening, compressibility and compactability as waste, biodegradability and composability, anti-static, high transparency and high gloss.

Coating Film

To improve as appropriate certain properties of the cellulose film such as moisture resistance, heat scalability, and/or machineability, optionally one or both sides of the film may be coated with one or more coatings which may for example be applied from a solvent and/or aqueous dispersion. Suitable coatings may include any which are suitable for the intended use such as conventional nitrocellulose, vinyl chloride and/or vinyl acetate coatings.

Preferred coatings which are suitable for use with cellulose films used as labels with wet glue adhesives include coatings which do not contain chlorine, such as those based on chlorine-free polymers for example acrylic, polyurethanes, polyesters, polyvinyl alcohols and/or any suitable mixtures or copolymers thereof.

Coatings may be applied at the end of a casting machine or within a high tower as appropriate.

In a coating tower the cellulose film web was immersed in a lacquer bath and excess lacquer was removed by doctor rollers. The lacquer was then smoothed by reverse smoothing rollers and any excess solvents were removed from the lacquer in a vertical drier and may be recovered. The web of film left the drier at the head roll and descended to ground level through a conditioner that restored the moisture lost during the during the coating and drying process. After being passed over chill rollers the coated film was wound back onto mill rolls. Coatings may also be applied to the film by spraying onto the web within a solvent tower rather than passing the web through a lacquer bath.

The present invention will now be described in detail with reference to the following non limiting example which is by way of illustration only.

Example 1

A production machine was set up in a conventional manner to produce regenerated cellulose film from the well known viscose method as described herein. The viscose used had a cellulose content of 9.3% and the resultant film had a substance of 30 grams per square meter.

One side of the film can be treated with a corona discharge and then printed. The reverse side of the film can be coated with a conventional coating of vinyl chloride/vinyl acetate copolymer at a coat weight of 60 g per $m^2$. A standard wet glue casein adhesive (50% water) can then be applied to the same side as the copolymer.

The label can then be directly applied to a bottle in a conventional way using unmodified (or only trivially modified) conventional labeling equipment set up for wet glue paper labels, to achieve a transparent printed label which dried rapidly on the bottle without significant wrinkling or misalignment of the label position to provide an acceptable clear look label on the bottle.

Example 2

A coating formulation was prepared (weights based on 100 parts of polymer) by mixing the following ingredients.

| Trade Name | Chemical Type | Amount w/w |
|---|---|---|
| Polymers | | |
| Hostaflex CM131 | PVC/PVA copolymer | 80 |
| Ixan PNE 613 | PVdC copolymer | 20 |
| Waxes | | |
| Behenic Acid | Fatty acid | 1.5 |
| Distec | Hydrogenated Castor Oil | 0.17 |
| Crodafos S2 | Mono and Di esters of Phosphoric acid | 0.27 |
| Lanco Wax E2S | fatty acid ester amide (amide wax) | 0.5 |
| Others | | |
| Infilm 1735 | Maleic acid- | 1.2 |
| | China Clay | 0.8 |

Two webs of a regenerated cellulose film were laminated together on casting machine dryers. This helped to give stiffness and stability to the film. The weight of this base film was 62 g/m$^2$ (43 microns thickness). The laminated film was then coated in a conventional manner with a solvent lacquer of the above copolymer coating formulation on both sides of the film (two side coating) to give after drying a semi permeable moisture barrier on both sides of the film. The final weight of the film was 64.5 g/m$^2$ (45 microns thickness).

The permeability of this coated film (measured in standard test ASTM E 96 at 38° C. and 90% relative humidity) was 370 g/m$^2$ day.

Other properties tested for the film of Example 2 are now given with test method indicated. All these tests were carried out at 23° C.+/−2° and 50% RH unless indicated.

Optical gloss at 45° was 95% (ASTM D 247); wide angle haze at 2.5° was 4% (ASTM D 1003); coefficient of friction (film to film) static was 0.25, dynamic was 0.20 (ASTM D 1894); mechanical data (ASTM D 882)-tensile strength was 162 NMm$^{-2}$ (MD) & 95 NMm$^{-2}$ (TD); elongation at break was 20% (MD) & 55% (TD) and elasticity modulus (1% Secant) was >3000 NMm$^{-2}$ (MD) & >1500 NMm$^{-2}$ (TD); temperature flexibility range was from 0° C. to 290° C.

This two sided coated film was then applied as a label film to a bottle using a conventional wet glue adhesive of 50% casein water applied to one side of the label film at the point of application. The label may be printed and/or metallised or otherwise coated before application of the wet glue on the adhesive side of the film so the print or metallisation is seen through the transparent cellulose film yet is protected form wear etc by the transparent film.

The above films have the following advantages for use as a label with a wet glue adhesive: excellent clarity for a "no-label" look; excellent printability using traditional printing methods; excellent adsorption and fast drying of the adhesive; anti-static and excellent slip properties; resistant to oils and greases; high stiffness for conversion; high gloss and a biodegradable base film.

The invention claimed is:

1. A label obtained by:
    coating at least one surface of a biopolymeric film with a first coating, wherein said first coating is a printable coating that is receptive to printing inks and controls water permeability so that the coated film, after drying, has a water permeability of from about 50 to about 600 g/m$^2$ day, measured in standard test ASTM E 96 at 38° C. and 90% relative humidity, wherein said printable coating comprises a material selected from the group consisting of nitrocellulose, vinyl chloride, vinyl acetate, chlorine-free acrylic, chlorine-free polyurethanes, chlorine-free polyesters, chlorine-free polyvinyl alcohols, and any mixture or copolymer thereof;
    printing on the printable coating;
    coating said biopolymeric film with a second coating, wherein said second coating is a composition comprising an adhesive dispersed in aqueous medium; and
    drying the film wherein said printable coating and said second coating are applied to opposite surfaces of said biopolymeric film.

2. The label according to claim 1, having a water permeability of from about 100 to about 400 g/m$^2$ day.

3. The label according to claim 1, wherein the biopolymeric film comprises regenerated cellulose.

4. The label according to claim 1, wherein the biopolymeric film is a two layer laminate.

5. The label according to claim 1, wherein said label has 1% Secant elasticity modulus of at least about 2000NMm$^{-2}$ in the machine direction of the biopolymeric film, wherein said 1% secant elasticity modulus is measured in standard test of ASTM D 882.

6. A label facestock comprising the label according to claim 1 adjacent a release liner.

7. The label according to claim 1, wherein said label has 1% Secant elasticity modulus of at least about 1000NMm$^{-2}$ in the transverse direction of the biopolymeric film, wherein said 1% secant elasticity modulus is measured in standard test of ASTM D 882.

8. A labeled article, obtained by applying a label to an article, wherein said label is prepared by:
    coating at least one surface of a biopolymeric film with a first coating, wherein said first coating is a printable coating that is receptive to printing inks and controls water permeability so that the coated film, after drying, has a water permeability of from about 50 to about 600 g/m$^2$ day, measured in standard test ASTM E 96 at 38° C. and 90% relative humidity, wherein said printable coating comprises a material selected from the group consisting of nitrocellulose, vinyl chloride, vinyl acetate, chlorine-free acrylic, chlorine-free polyurethanes, chlorine-free polyesters, chlorine-free polyvinyl alcohols, and any mixture or copolymer thereof;
    printing on the printable coating;
    coating said biopolymeric film with a second coating, wherein said second coating is a composition comprising an adhesive dispersed in aqueous medium; and
    drying the film wherein said printable coating and said second coating are applied to opposite surfaces of said biopolymeric film.

9. A transparent label, comprising:
    a self-supporting transparent biopolymeric film;
    a first coating, wherein said first coating is a transparent printable coating comprising a component that is receptive to printing inks, said printable coating controls water permeability so that the coated film, after drying, has a water permeability of from about 50 to about 600 g/m$^2$ day, measured in standard test ASTM E 96 at 38° C. and 90% relative humidity, wherein said printable coating comprises a material selected from the group consisting of nitrocellulose, vinyl chloride, vinyl acetate, chlorine-free acrylic, chlorine-free polyurethanes, chlorine-free polyesters, chlorine-free polyvinyl alcohols, and any mixture or copolymer thereof; and
    a second coating, wherein said second coating is an adhesive coating wherein said printable coating and said adhesive coating are applied to opposite surfaces of said biopolymeric film.

10. The transparent label of claim 9, wherein said adhesive coating is applied on top of said printable coating.

11. A wet-glue label obtained by coating a biopolymeric film on at least one surface thereof with a composition with a wet-glue adhesive dispersed therein;
    treating at least the opposite surface of the film to improve its printability; and
    drying the film to form a wet-glue label having a water permeability of from about 100 to about 400 g/m$^2$ day.

12. The label according to claim 11, wherein the biopolymeric film comprises regenerated cellulose.

13. The label according to claim 11, wherein the biopolymeric film is a two layer laminate.

14. The label according to claim 11, wherein said label has 1% Secant elasticity modulus of at least about 2000NMm$^{-2}$ in the machine direction of the biopolymeric film, wherein said 1% secant elasticity modulus is measured in standard test of ASTM D 882.

* * * * *